United States Patent [19]

Alfrey et al.

[11] Patent Number: 5,020,073
[45] Date of Patent: May 28, 1991

[54] APPARATUS FOR ALIGNING THE OPTIC AXIS OF AN INTRA-CAVITY BIREFRINGENT ELEMENT, AND TUNABLE LASER USING SAME

[75] Inventors: Anthony J. Alfrey, Half Moon Bay; James A. Palmer, San Jose, both of Calif.

[73] Assignee: Spectra-Physics, Mountain View, Calif.

[21] Appl. No.: 319,980

[22] Filed: Mar. 7, 1989

[51] Int. Cl.$^5$ .............................................. H01S 3/08
[52] U.S. Cl. .................................................. 372/105
[58] Field of Search ...................... 372/66, 20, 105, 92, 372/39, 29, 108

[56] References Cited

U.S. PATENT DOCUMENTS

| | | | |
|---|---|---|---|
| 3,983,507 | 9/1976 | Tang et al. | 378/20 |
| 4,438,517 | 3/1984 | Bobb et al. | 372/29 |
| 4,567,597 | 1/1986 | Mandella | 372/66 |
| 34,642,809 | 2/1987 | Petheram | 372/66 |

OTHER PUBLICATIONS

Arnold L. Bloom, "Modes of a Laser Resonator Containing Tilted Birefrigent Plates", Journal of the Optical Society of America, vol. 64, No. 4, Apr. 1974.
Preuss et al., "Three-Stage Birefringent Filter Tuning Smoothly Over the Visible Region: Theoretic Treatment and Experimental Design", Applied Optics, vol. 19, No. 5, Mar. 1, 1980.
Holtom et al., "Design of a Birefringent Filter for High-Power Dye Lasers", IEEE Journal of Quantum Electronics, vol. QE-10, No. 8, Aug. 1974.
Mudare et al., "Simple Alignment Procedure for the Assembly of Three-Plate Birefringent Filters for Tunable Dye Lasers", Applied Optics, vol. 22, No. 5, Mar. 1, 1983.
November et al., "Derivation of the Universal Wavelength Tuning Formula for a Lyot Birefringent Filter," Applied Optics, vol. 23, No. 13, Jul. 15, 1984.
Peter A. Schultz, "Single-Frequency Ti:Al$_2$O$_3$ Ring Laser", IEEE Journal of Quantum Electronics, vol. 24, No. 6, Jun. 1988.
Anthony J. Alfrey, U.S. Ser. No. 07/241,698, filed Jan. 6, 1990.

Primary Examiner—Léon Scott, Jr.
Attorney, Agent, or Firm—Fliesler, Dubb, Meyer & Lovejoy

[57] ABSTRACT

Alignment of a birefringent tunable laser gain medium characterized by a first face and a second face cut at Brewster's angle so that a plane of polarization is defined. The gain medium is secured in the optical path by a rotatable member having an axis of rotation that is normal to the Brewster faces of the optical device. Coupled with the rotatable member is a support allowing adjustment of the angular position about the axis of rotation fo the rotatable member. An operator adjusts the angular position of the rotatable member until the C-axis of the gain medium lies in the plane of polarization. Even though the C-axis may not be parallel to the direction of polarization, the depolarization effects of the misalignment are eliminated by proper adjustment of the angular position relative to the plane of polarization. A tunable, solid state laser using the alignment apparatus with a birefringent filter achieves greater linear tuning range.

34 Claims, 4 Drawing Sheets

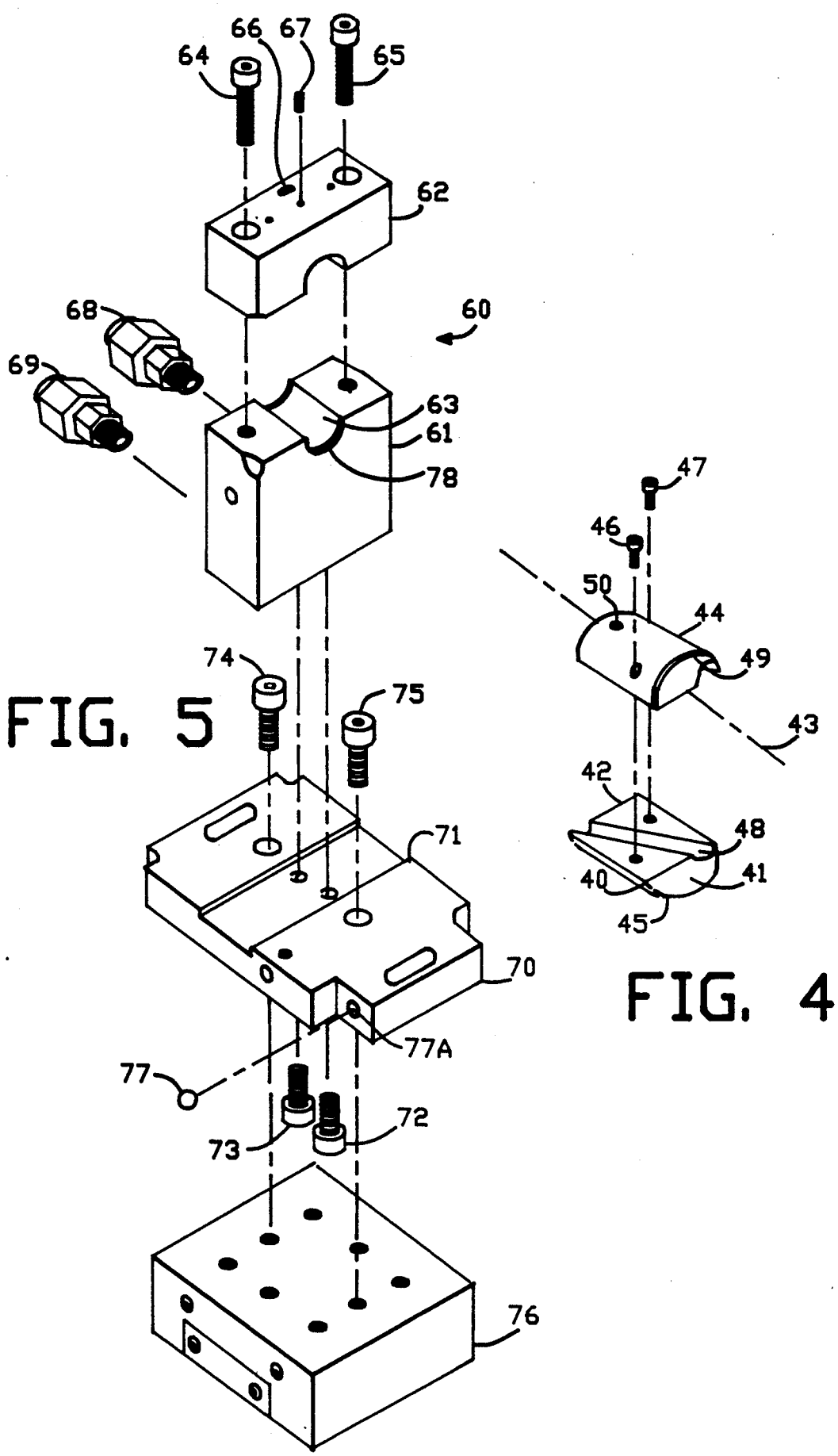

APPARATUS FOR ALIGNING THE OPTIC AXIS OF AN INTRA-CAVITY BIREFRINGENT ELEMENT, AND TUNABLE LASER USING SAME

CROSS-REFERENCE TO RELATED APPLICATIONS

The following U.S. patent applications are incorporated by reference as if fully set forth herein, and are related to the present application.

1. Alfrey, LONGITUDINALLY PUMPED LASER OSCILLATOR, Ser. No. 07/241,698; Filed: Sept. 7, 1988; now U.S. Pat. No. 4,891,831.

2. Woodward et al., TUNABLE DYE LASER WITH THIN BIREFRINGENT FILTER FOR IMPROVED TUNING, Ser. No. 07/260,930; Filed Oct. 21, 1988.

Each of the above listed related applications was owned at the time of invention and is currently owned by the same assignee as the present invention.

BACKGROUND OF THE INVENTION

1. Field of the Invention

The present invention relates to the alignment of a crystalline axis of an optical device having Brewster faces; and, more particularly, to aligning a crystalline axis of a birefringent element so that it lies in the plane of the polarization defined by Brewster faces of the birefringent element.

2. Description of Related Art

Optical devices having Brewster cut faces are in widespread use. Brewster faces define a plane of polarization for light propagating though the optical device. Many such devices are fabricated from crystalline material with well-defined crystalline axes. Such optical devices are manufactured so that one such crystalline axis is as close to the direction of polarization as possible. However, with current manufacturing techniques, it is difficult to ensure that the selected crystalline axis is closely aligned with the direction of polarization.

Where the optical device is birefringent and defines a long path between the Brewster faces, this misalignment of the crystalline axis can result in significant depolarization effects. When such an optical device is used in a laser cavity that includes another element which is sensitive to polarization, the depolarization effects can have an effect on the performance of the sensitive element. For instance, birefringent filters in widespread use in tunable lasers are very sensitive to the polarization of the beam in the cavity. Background concerning birefringent filters can be found in Bloom, "Modes of a Laser Resonator Containing Tilted Birefringent Plates", JOURNAL OF THE OPTICAL SOCIETY OF AMERICA, Vol. 64, No. 4, April 1974; Preuss et al., "Three-Stage Birefringent Filter Tuning Smoothly Over the Visible Region: Theoretic Treatment and Experimental Design", APPLIED OPTICS, Vol. 19, No. 5, Mar. 1, 1980; Holtom et al., "Design of a Birefringent Filter for High-Power Dye Lasers", IEEE JOURNAL OF QUANTUM ELECTRONICS, Vol. QE-10, No. 8, August 1974; Mudare et al., "Simple Alignment Procedure for the Assembly of Three-Plate Birefringent Filters for Tunable Dye Lasers", APPLIED OPTICS, Vol. 22, No. 5, March 1, 1983; and November et al., "Derivation of the Universal Wavelength Tuning Formula for a Lyot Birefringent Filter", APPLIED OPTICS, Vol. 23, No. 14, July 15, 1984.

One of the factors which limits the smooth tuning range of tunable solid state lasers, such as those using a Ti:sapphire or a cobalt magnesium fluoride gain medium, is the misalignment of the selected crystalline axis of the gain medium with resulting depolarization, affecting the operation of the birefringent tuning filter. As recognized in Schulz, "Single-Frequency Ti:Al$_2$O$_3$ Ring Laser", IEEE JOURNAL OF QUANTUM ELECTRONICS, Vol. 24, No. 6, June 1988, it is very important to ensure that the crystallographic orientation of the Brewster faces aligns the C-axis of the Ti:sapphire crystal as close as possible to the direction of polarization of the laser beam. However, due to the relatively long optical path through the gain medium, the effect of a small misalignment can be significant.

Accordingly, it is desirable to have an apparatus for minimizing the depolarizing effect of misalignment of the optic axis of birefringent elements with respect to Brewster cut faces of those elements. Further, it is desirable to make such an alignment without disturbing the operation of the laser cavity.

SUMMARY OF THE INVENTION

The present invention provides an apparatus for aligning an optical device in an optical path. The optical device is characterized by a first face and a second face cut at Brewster's angle so that a plane of polarization is defined, and by having a direction of propagation extending between the first and second faces. The optical device is secured in the optical path by a rotatable member having an axis of rotation that is normal to the Brewster faces of the optical device. Coupled with the rotatable member is a support allowing adjustment of the angular position about the axis of rotation of the rotatable member. An operator adjusts the angular position of the rotatable member until a selected crystalline axis (i.e. C-axis for Ti:Sapphire) lies in the plane of polarization. Even though the crystalline axis may not be parallel to the direction of polarization, it is sufficient that the crystalline axis be aligned to lie within the plane of polarization to eliminate depolarization effects.

According to another aspect, the present invention is a tunable laser comprising a laser cavity defining an optical path. A birefringent filter is mounted within the laser cavity along an optical path, allowing for tuning of the output wavelength of the laser. A birefringent gain medium is mounted within the optical path. The gain medium has a first face and a second face cut at Brewster's angle so that a plane of polarization is defined and has a direction of propagation extending between the first and second faces. The birefringent gain medium is mounted in a rotatable member having an axis of rotation which is normal to the first face of the gain medium. The rotatable member is supported in the optical path by an element allowing for adjustment of the angular position about the axis of rotation of the rotatable member to minimize the effect of the birefringent gain medium on the operation of the birefringent filter.

Other aspects, features and advantages of the present invention can be seen upon review of the figures, detailed description and claims which follow.

BRIEF DESCRIPTION OF THE FIGURES

FIG. 4 is an exploded view of a rotatable member for securing the birefringent gain medium in the optical path of the laser cavity.

FIG. 5 is an exploded view of an apparatus for supporting the rotatable member so that the angular position of the rotatable member about an axis of rotation can be adjusted.

DETAILED DESCRIPTION

With reference to the figures, a detailed description of a preferred embodiment of the present invention is provided.

Figure 1:
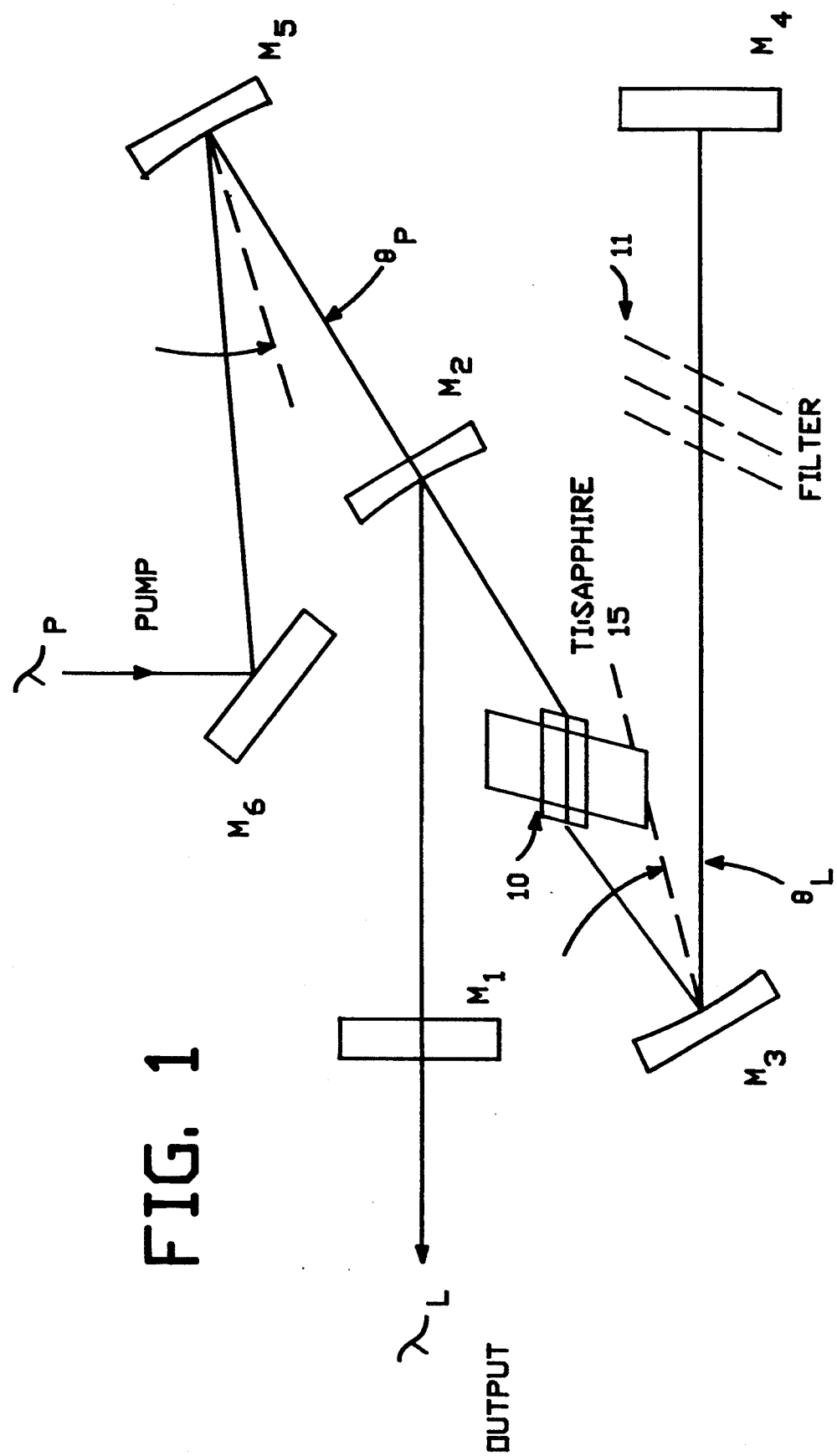
FIG. 1 is a schematic diagram of a tunable laser with a birefringent gain medium according to the present invention.
Figure 2:
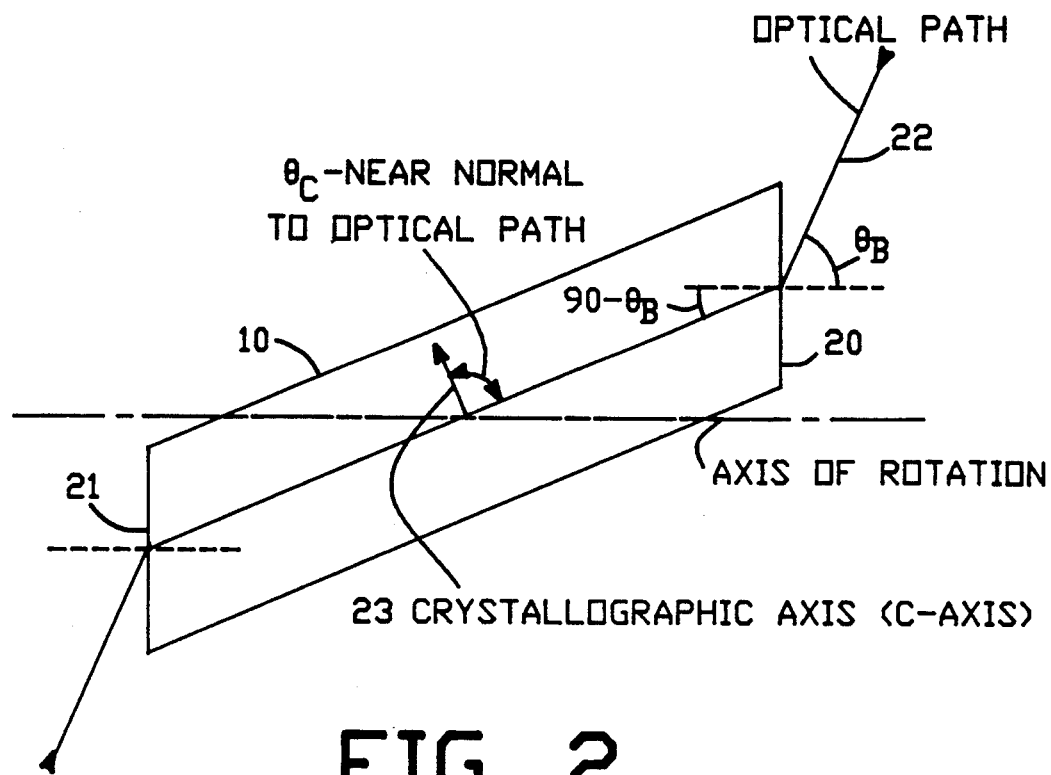
FIG. 2 is a top view diagram illustrating the geometry of the birefringent gain medium of FIG. 1.
Figure 3:
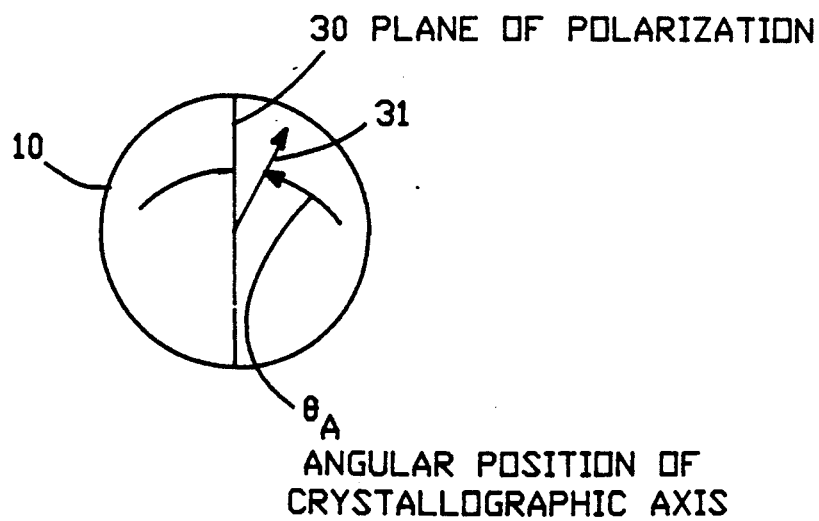
FIG. 3 is an end view diagram of the gain medium used in illustrating the angular position of a selected crystalline axis of the gain medium.

FIG. 1 is a schematic diagram of a laser system in which a preferred embodiment of the present invention is applied. The laser system illustrated in FIG. 1 is described in detail in the above referenced U.S. patent application entitled LONGITUDINALLY PUMPED LASER OSCILLATOR. FIGS. 2 and 3 illustrate misalignment of a crystalline axis (e.g. C-axis) in a titanium sapphire rod with respect to Brewster faces of the rod. FIGS. 4, 5, 6, and 7 set forth a preferred embodiment of the means for aligning the gain medium or another optical element according to the present invention.

FIG. 1 illustrates a longitudinally pumped folded cavity Ti:sapphire laser resonator. The resonator consists of a flat output coupler M1 with a transmission T equal to 3.5 percent, spherical concave mirror M2 with a radius of 10 cm, spherical concave mirror M3 with a radius of 10 cm, and a flat high reflector M4. Mirrors M2 and M3 are high reflectors at the laser wavelength $\lambda_L$ and transparent at the pump wavelength $\lambda_P$. A Ti:sapphire rod Brewster cut to a path length of 2 cm with a crystal C-axis cut to be as closely parallel to the optical electric field as possible is utilized. This optical electric field defines a plane of polarization for the cavity mode within the rod, and its direction is determined by the orientation of the Brewster faces of the rod. The geometry of the C-axis, which is a crystalline axis of the Ti:sapphire crystal, is described in more detail with reference to FIGS. 2 and 3.

In the laser resonator of FIG. 1, a longitudinal pump beam is supplied from an argon ion laser. The pump beam is guided off a first flat reflector M6 to spherical concave mirror M5. Mirror M5 is a high reflector which guides the pump beam through mirror M2 collinearly with the cavity mode in the Ti:sapphire rod 10.

The resonator is tuned through a range of 700-1000 nanometers with a birefringent filter 11 such as is described in the above cross-referenced U.S. patent application entitled TUNABLE DYE LASER WITH THIN BIREFRINGENT FILTER FOR IMPROVED TUNING.

An alignment apparatus 15 secures the Ti:sapphire rod within the optical path of the laser resonator. The alignment apparatus is described in detail with reference to FIGS. 4-7.

FIG. 2 is a top view of the Ti:sapphire gain medium used in the laser resonator of FIG. 1. The gain medium includes a first face 20, and a second face 21 which are cut optically parallel and at Brewster's angle so that a beam along optical path 22 entering first face at Brewster's angle $\Theta_B$ will be transmitted with a plane of polarization defined by the Brewster angle through the Ti:sapphire crystal 10.

The Ti:sapphire crystal 10 is cut so that the crystalline axis 23 is oriented with respect to the Brewster faces so that $\Theta_c$ is as parallel as possible to the optical electric field normal to the optical path. However, due to manufacturing tolerances, the crystalline axis 23 is non-parallel. It is difficult using present techniques to ensure that the crystalline axis is within better than $\frac{1}{2}$ of one degree of the direction of the optical electric field.

FIG. 3 illustrates another characteristic of the misalignment of the optic axis. In particular, the Brewster faces 20 and 21 define a plane of polarization. FIG. 3 is an end view of the rod showing a plane of polarization 30. The line 3 represents a crystalline axis on the plane of the paper normal to the plane of polarization. As can be seen, the crystalline axis has an angular position $\Theta_A$ with respect to the plane of polarization 30.

Because of the misalignment of the crystalline axis as illustrated in FIGS. 2 and 3, and because of the birefringence of a Ti:sapphire rod, slight depolarization of the beam passing along the optical path 22 occurs. This is particularly problematic if the gain medium 10 has substantial length.

As mentioned above with respect to the Schulz article, this misalignment of the crystalline axis and the resulting depolarization, has an effect on the operation of the birefringent filter in the laser resonator. Therefore, the present invention includes an alignment apparatus 15 for aligning the crystalline axis in the plane of polarization 30. Even though the crystalline axis remains non-parallel to the optical electric field, it lies essentially within the plane of polarization 30 and the birefringence effects of the rod are not seen in terms of depolarization. Rather they occur merely as a slight loss in gain in the rod due to misalignment reflected in $\Theta_c$.

The alignment apparatus 15 according to the present invention is illustrated in FIGS. 4 and 5. FIG. 4 is an exploded view of a rotatable member 40 consisting of a first part 44 and a second part 45. The rotatable member 40, when assembled, is a cylindrical brass member having a first end 41 and a second end 42. The first end 41 is parallel to the second end. There is an axis of rotation normal to the first end 41 and the second end 42 defined by the longitudinal axis 43 of the cylinder. The first part 44 and a second part 45 are secured by screws 46 and 47. When connected by screws 46 and 47, the parts 44 and 45 form the rotatable member 40 with a passage 48 sending from the first end 41 to the second end 42. The passage 48 is adapted to secure the Ti:sapphire rod so that the first face and second face of the rod are oriented at Brewster's angle with respect to the optical path of the laser resonator independent of rotation about the axis of rotation 43 of the rotatable member 40.

The rotatable member 40 includes bevelled edges 49 and a small hole 50 on the top part 44. The small hole 50 is adapted to receive a pin or other object so that the angular position of the rotatable member 40 about the longitudinally axis 43 can be adjusted by a technician.

The rotatable member 40 is adapted to be supported in the optical path of the laser resonator by the apparatus illustrated in FIG. 5. The apparatus includes a guide block 60 having a first part 61 and a second part 62 formed with machined brass. The guide block 60, when assembled, has a cylindrical guide 63 through it. The rotatable member 40 sits in the guide 63 for support in the optical path. Ridges 78 are machined so that assembly of the apparatus is simplified.

The first part 61 and the second part 62 are adapted to be connected by screws 64 and 65. A slot 66 is cut through the top of the second part 62 into the guide passage 63. The slot 66 allows a technician to insert a pin into the hole 50 (FIG. 4) on the rotatable member 40. Using the pin, the angular position of the rotatable member 40 is precisely adjusted until the depolarization effects of the birefringence of the Ti:sapphire rod are eliminated, by rotating the selected crystalline axis into the plane of polarization defined by the Brewster faces of the rod. A set screw 67 screws through the top member 62 into the top surface 44 of the rotatable member 40 to hold the angular position secure.

Figure 7:
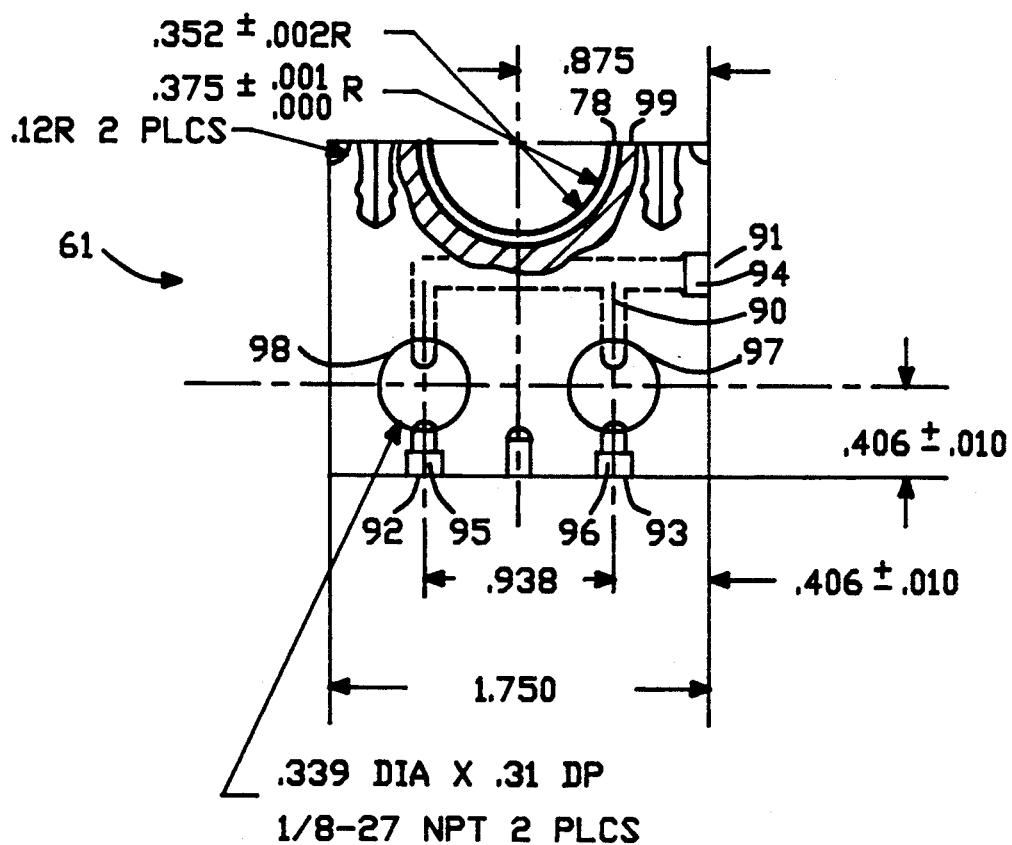
FIG. 7 illustrates the mechanism for flowing a cooling medium through the support for the rotatable member and other aspects of the support.

The first part 61 of the block 60 includes a passage for flowing a cooling medium through the block as shown in more detail in FIG. 7. Nozzles 68 and 69 are adapted to be mated on the block to provide a source of cooling medium.

The part 61 fits on an adapter plate 70 in slot 71. Screws 72 and 73 screw through the adapter plate 70 into the part 61 of the guide member 60. The adapter plate 70 is secured by screws 74 and 75 onto a translation member 76. The translation member is commercially available from Daedal, Inc. in Harrison City, Pa. A ball 77 is glued at point 77A on the adapter plate 70 to provide a contact point for precise adjustment with the translation member 76 as known in the art so that the rod can be translated during operation of the laser without disturbing laser operation.

The rotatable member 40 and guide member 60 are formed of free-machined brass. A decorative black chromate conversion coating is applied to these members in the preferred embodiment.

Figure 6:
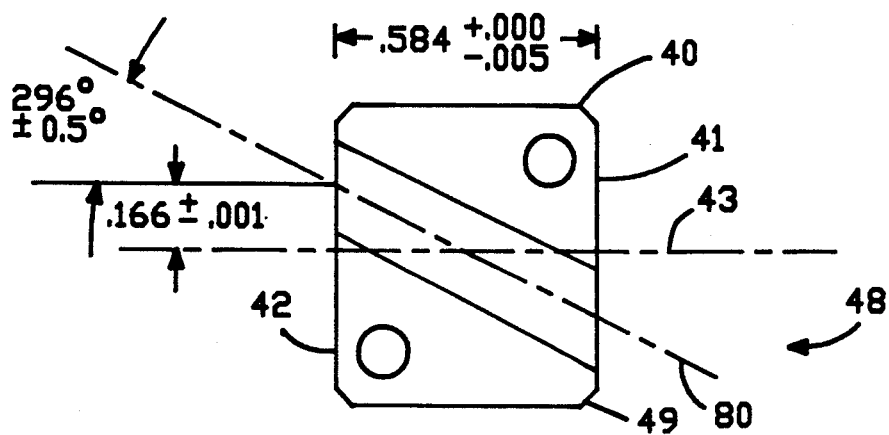
FIG. 6 is a top view of the rotatable member of FIG. 4.

FIG. 6 is a cross-sectional view of the rotatable member 40. The axis of rotation 43 goes through the longitudinal axis of the cylinder defined by the rotatable member 40. The bevelled edges 49 are cut so that the rotatable member does not contact ridges 78 in the guide passage 63 of the guide member 60. The passage 63 is cut so that the longitudinal axis 80 between the Brewster out faces lies at 29.6 degrees ±0.5 degrees from the normal to the first end at 41 and second end 42 of the rotatable member. The longitudinal axis 80 of the passage 48 adapted to hold the laser medium is 0.166±0.001 inches from the axis of rotation 43. The diameter of the bore defining a passage 48 is 0.1250 (+0.0000 or −0.0005) in radius. The radius of the rotatable member is 0.374 (+0.000 or −0.001) inches.

The first part 61 of the guide member 60 is illustrated in FIG. 7 showing the cooling medium passages. In particular, tubes 90 are drilled into the first part 61 from locations 91, 92 and 93 on the block. The drill holes are then plugged using plugs 94, 95 and 96. Holes 97 and 98 are then drilled into the passages 90 and threaded so that they can couple with the cooling medium coupling elements 68 and 69 (FIG. 5). Cut away 99 allows a view of ridge 78 on the back side of the guide.

The slot 66 through the part 62 of the guide 60 as shown in FIG. 5 is 3/16ths of an in It can be seen that by mounting the optical device, such as the Ti:sapphire gain medium, in the rotatable member 40, so that the axis of rotation of the rotatable member is normal to the Brewster face of the optical device, the rotatable member acquires an adjustable angular position about the axis of rotation relative to the plane of polarization through the optical device. The guide block 60 provides a means for adjusting the angular position about the axis of rotation of the rotatable member so that a crystalline axis of the optical device can be brought within the plane of the polarization.

It will be appreciated by those in the art that the rod shaped gain medium is not the only optical device that could be aligned using an apparatus according to the present invention. Different shaped optical devices would result in different shaped passages 48 through the rotatable member 40. Further, the rotatable member could take the form of a support structure other than a cylindrical block with a passage cut through there through.

A key feature of the invention is that the rod adjustment may be undertaken during the operation of the laser without causing misalignment of the optical path with respect to the other components of the laser cavity (e.g. mirrors, filters). An adjustment of the C-axis might be achieved by simply rotating the rod about an axis collinear with the axis of propagation within the rod. However, such a rotation would change the orientation of the Brewster faces of the rod with respect to the optical path, resulting in a misalignment of the laser cavity. Such an adjustment would then require the realignment of the remaining cavity components with each adjustment of the rod.

The foregoing description of a preferred embodiment of the present invention has been provided for the purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for aligning a laser gain medium in an optical path, the gain medium having a first face and a second face, at least one of the first and second faces at Brewster's angle so that a plane of polarization is defined, comprising:
   rotatable means, having an axis of rotation and an adjustable angular position about the axis of rotation, for securing the gain medium in the optical path so that the optical path intersects the first and second faces, and wherein the axis of rotation is normal to the one face at Brewster's angle; and
   means, connected to the rotatable means, for adjusting the adjustable angular position relative to the plane of polarization.

2. The apparatus of claim 1, wherein the gain medium is birefringent.

3. The apparatus of claim 1, wherein the gain medium includes an anisotropic crystal.

4. The apparatus of claim 1, wherein the gain medium is rod-shaped.

5. The apparatus of claim 1, wherein the gain medium is a crystal of titanium sapphire having a C-axis, and the C-axis lies in a plane having an angular position about the axis of rotation determined by the adjustable angular position.

6. The apparatus of claim 1, wherein the rotatable means includes:

a cylindrical member having a first end, a second end, and a longitudinal axis, the longitudinal axis being the axis of rotation, and the first and second ends being normal to the longitudinal axis, the cylindrical member further having a passage from the first end to the second end, the gain medium being secured within the passage so that the first face and the second face are parallel to the first end and second end, respectively, of the cylindrical member.

7. The apparatus of claim 6, wherein the means for adjusting includes:
a guide for supporting the cylindrical member so that the optical path traverses the gain medium while permitting rotation about the longitudinal axis.

8. The apparatus of claim 7, wherein the cylindrical member and the guide are formed of heat conducting material, and further including:
means, coupled to the guide, for flowing a cooling medium in contact with the guide.

9. An apparatus for aligning a laser gain medium in an optical path, the gain medium having a first face and a second face, at least one of the first and second faces at Brewster's angle so that a plane of polarization is defined, comprising:
rotatable means, having an axis of rotation and an adjustable angular position about the axis of rotation relative to the plane of polarization, for securing the gain medium in the optical path so that the optical path intersects the first and second faces, and wherein the axis of rotation is normal to the one face at Brewster's angle; and
means, connected to the rotatable means, for adjusting the adjustable angular position relative to the plane of polarization wherein the means for adjusting includes:
a guide for supporting the rotatable means so that the optical path traverses the gain-medium while permitting rotation about the axis of rotation.

10. The apparatus of claim 9, wherein the rotatable means and the guide comprise heat conducting material so that heat may flow from the gain medium to the guide, and further including:
means, coupled to the guide, for flowing a cooling medium in contact with the guide.

11. An apparatus for generating a laser beam at an operating frequency, comprising:
a laser cavity defining an optical path;
a birefringent filter mounted within the laser cavity along the optical path;
a birefringent device having a crystallographic axis lying in a first plane, the birefringent device and the birefringent filter cooperatively affecting the operating frequency, the birefringent device having a first face and a second face out at Brewster's angle so that a plane of polarization is defined and having a direction of propagation extending between the first and second faces;
means for securing the birefringent device in the optical path so that the first plane is parallel to the plane of polarization.

12. The apparatus of claim 12, wherein the birefringent device includes an anisotropic crystal.

13. The apparatus of claim 11, wherein the birefringent device is a rod-shaped laser gain medium.

14. The apparatus of claim 11, wherein the birefringent device is a tunable laser gain medium.

15. The apparatus of claim 11, wherein the birefringent device is a crystal of titanium sapphire having a C-axis, and the C-axis is the crystallographic axis.

16. An apparatus for generating a laser beam, comprising:
an optical resonant cavity defining an optical path;
a birefringent filter mounted within the resonant cavity along the optical path;
a gain medium, the gain medium having a first face and a second face at Brewster's angle so that a plane of polarization is defined;
rotatable means, having an axis of rotation, for securing the gain medium in the optical path so that the axis of rotation is normal to the first face and the rotatable means has an adjustable angular position about the axis of rotation;
means, connected to the rotatable means, for adjusting the adjustable angular position; and
means, coupled with the resonant activity, for supplying a pump energy bean longitudinally into the gain medium through at least one of the first and second faces.

17. The apparatus of claim 16, wherein the gain medium includes an anisotropic crystal having a C-axis, and the C-axis lies in a plane having an angular position about the axis of rotation determined by the adjustable angular position.

18. The apparatus of claim 16, wherein the gain medium is rod-shaped.

19. The apparatus of claim 16, wherein the gain medium is crystal of titanium sapphire having a C-axis, and the C-axis lies in a plane having an angular position about the axis of rotation determined by the adjustable angular position.

20. The apparatus of claim 16, wherein the rotatable means includes:
a cylindrical member having a first end, a second end, and a longitudinal axis, the longitudinal axis being the axis of rotation, and the first and second ends being normal to the longitudinal axis, the cylindrical member further having a passage from the first end to the second end, the gain medium being secured within the passage so that the first face and the second face are parallel to the first end and second end, respectively, of the cylindrical member.

21. The apparatus of claim 20, wherein the means for adjusting includes:
a guide for supporting the cylindrical member so that the optical path traverses the gain medium while permitting rotation about the longitudinal axis.

22. The apparatus of claim 21, wherein the cylindrical member and the guide are formed of heat conducting material, and further including:
means, coupled to the guide, for flowing a cooling medium in contact with the guide.

23. The apparatus of claim 16, wherein the means for adjusting includes:
a guide for supporting the rotatable means so that the optical path traverses the gain medium while permitting rotation about the axis of rotation.

24. The apparatus of claim 23, wherein the rotatable means and the guide are formed of heat conducting material so that heat may flow from the gain medium to the guide, and further including:
means, coupled to the guide, for flowing a cooling medium in contact with the guide.

25. An apparatus for generating a laser beam, comprising:
   an optical resonant cavity defining an optical path;
   tunable means, mounted within the resonant cavity, for tuning the resonant cavity to select a longitudinal mode;
   a gain medium comprising an anisotropic crystalline material having a crystalline axis and capable of supporting laser gain over a range of wavelengths, the gain medium having a first face and a second face at Brewster's angle so that a plane of polarization is defined;
   rotatable means, having an axis of rotation, for securing the gain medium in the optical path so that the axis of rotation is normal to the first face and the rotatable means has an adjustable angular position about the axis of rotation;
   means, connected to the rotatable means, for adjusting the adjustable angular position in order to align the crystalline axis essentially within the plane of polarization; and
   means, coupled with the resonant activity, for supplying a pump energy beam longitudinally into the gain medium through at least one of the first and second faces.

26. The apparatus of claim 25, further including:
   means, in heat flow communication with the gain medium, for controlling temperature of the gain medium.

27. The apparatus of claim 25, wherein the gain medium is rod-shaped.

28. The apparatus of claim 25, wherein the gain medium comprises titanium:sapphire.

29. The apparatus of claim 25, wherein the rotatable means includes:
   a cylindrical member having a first end, a second end, and a longitudinal axis, the longitudinal axis being the axis of rotation, and the first and second ends being normal to the longitudinal axis, the cylindrical member further having a passage from the first end to the second end, the gain medium being secured within the passage so that the first face and the second face are parallel to the first end and second end, respectively, of the cylindrical member.

30. The apparatus of claim 29, wherein the means for adjusting includes:
   a guide for supporting the cylindrical member so that the optical path traverses the gain medium while permitting rotation about the longitudinal axis.

31. The apparatus of claim 30, wherein the cylindrical member and the guide are formed of heat conducting material, and further including:
   means, coupled to the guide, for flowing a heat transfer medium in contact with the guide.

32. The apparatus of claim 25, wherein the means for adjusting includes:
   a guide for supporting the rotatable means so that the optical path traverses the gain medium while permitting rotation about the axis of rotation.

33. The apparatus of claim 25, wherein the rotatable means comprises heat conducting material so that heat may flow from the gain medium to the rotatable means, and further including:
   means, in heat flow communication with the rotatable means, for flowing a heat transfer medium in heat flow communication with the rotatable means.

34. The apparatus of claim 25, wherein the axis of rotation intersects the gain medium.

* * * * *